(12) United States Patent
Smith

(10) Patent No.: US 11,142,260 B2
(45) Date of Patent: Oct. 12, 2021

(54) FLOW RESTRICTING DEFLECTOR

(71) Applicant: PACCAR Inc, Bellevue, WA (US)

(72) Inventor: Jeffrey P. Smith, Prosper, TX (US)

(73) Assignee: PACCAR Inc, Bellevue, WA (US)

(*) Notice: Subject to any disclaimer, the term of this patent is extended or adjusted under 35 U.S.C. 154(b) by 71 days.

(21) Appl. No.: 16/781,754

(22) Filed: Feb. 4, 2020

(65) Prior Publication Data

US 2020/0172171 A1  Jun. 4, 2020

Related U.S. Application Data

(63) Continuation of application No. 15/970,685, filed on May 3, 2018, now Pat. No. 10,577,026.

(51) Int. Cl.
*B60R 19/34* (2006.01)
*B62D 25/18* (2006.01)
*B62D 35/00* (2006.01)

(52) U.S. Cl.
CPC ........... *B62D 25/18* (2013.01); *B62D 35/001* (2013.01)

(58) Field of Classification Search
CPC ............... Y02T 10/12; B01D 21/0012; B01D 21/0039; B01D 21/08; B01D 21/2444; E03D 9/00; A61M 3/0279; A47J 31/60; A47J 43/0705; A61B 90/05
See application file for complete search history.

(56) References Cited

U.S. PATENT DOCUMENTS

| | | | | |
|---|---|---|---|---|
| 4,627,631 A * | 12/1986 | Sherman | ............ | B62D 25/168 280/851 |
| 4,640,541 A * | 2/1987 | FitzGerald | .......... | B62D 35/001 280/851 |
| 4,858,941 A * | 8/1989 | Becker | ................. | B62D 25/168 280/851 |
| 5,058,827 A * | 10/1991 | Dansereau | ............. | B64C 25/32 244/103 R |
| 8,814,253 B1 * | 8/2014 | Butler | ................. | B62D 35/001 296/180.4 |
| 8,882,176 B2 | 11/2014 | Froling et al. | | |
| 9,284,000 B1 * | 3/2016 | Smith | ................. | B62D 25/188 |
| 9,926,022 B1 | 3/2018 | Golembeski et al. | | |
| 10,207,744 B1 * | 2/2019 | Smith | ................. | B62D 25/182 |
| 10,829,161 B1 * | 11/2020 | Vu | ......................... | B62D 25/18 |
| 2005/0040637 A1 * | 2/2005 | Wood | .................. | B62D 25/168 280/768 |
| 2009/0295190 A1 * | 12/2009 | Kottenstette | ......... | B62D 35/005 296/180.3 |
| 2011/0304129 A1 | 12/2011 | Owens | | |
| 2013/0059519 A1 | 3/2013 | Tajima et al. | | |

(Continued)

*Primary Examiner* — Kiran B Patel
(74) *Attorney, Agent, or Firm* — Seed IP Law Group LLP

(57) ABSTRACT

Drag reducing systems for vehicles are provided. In one aspect, a drag reducing system generally includes a flow restricting deflector couplable to a mount and positioned upstream in a path of airflow to an object. The flow restricting deflector generally includes a body portion and a plurality of flow choking orifices configured to provide a choked airflow condition. In another aspect, the drag reducing system is configured for positioning adjacent a wheel and tire combination of a vehicle upstream in a path of airflow to the wheel and tire combination. The flow restricting deflector may be coupled to and extending downward from a splash shield adjacent the wheel and tire combination.

20 Claims, 4 Drawing Sheets

(56) References Cited

U.S. PATENT DOCUMENTS

| | | | |
|---|---|---|---|
| 2014/0367993 A1* | 12/2014 | Breidenbach | B62D 35/001 |
| | | | 296/180.4 |
| 2015/0076860 A1 | 3/2015 | Rettig | |
| 2016/0059910 A1 | 3/2016 | Durand et al. | |
| 2017/0240223 A1 | 8/2017 | Gaylard et al. | |
| 2017/0240224 A1 | 8/2017 | Gaylard et al. | |
| 2018/0043944 A1* | 2/2018 | Magee | B62D 35/02 |
| 2018/0162458 A1 | 6/2018 | McMillan et al. | |
| 2018/0370580 A1* | 12/2018 | Butler | B62D 35/008 |
| 2019/0031251 A1* | 1/2019 | Butler | B62D 35/001 |
| 2019/0039664 A1 | 2/2019 | Tjoelker et al. | |
| 2019/0144052 A1* | 5/2019 | Magee | B62D 35/02 |
| | | | 296/180.2 |
| 2019/0359264 A1* | 11/2019 | Smith | B62D 35/001 |
| 2020/0122781 A1* | 4/2020 | Magee | B62D 35/02 |
| 2020/0290687 A1* | 9/2020 | Magee | B62D 35/008 |

\* cited by examiner

FLOW RESTRICTING DEFLECTOR

BACKGROUND

Description of the Related Art

Numerous means have been sought to improve the fuel-efficiency of moving bodies and, especially, moving bluff bodies by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor having a so-called fifth wheel by which a box-like semi-trailer may be attached to the tractor by an articulated connection for transportation of the cargo trailer. Conventional tractors may include tandem (dual) or tridem (triple) rear axles, where two or three sets of axles are positioned close together along the length of the tractor, near the fifth wheel, to carry the weight of the trailer. Conventional trailers also may include tandem or tridem axles.

It is well known that bluff bodies, such as tractors and trailers, contribute significantly to aerodynamic drag, as evidenced by the formation of a wake along the length of and in the trailing region behind the trailer. Additionally, various components of the tractors and trailers, such as the wheels and tires, also contribute significantly to the aerodynamic drag of the vehicle. The generation of eddies can be contributed to the shape and rotation of the wheels and tires as the vehicle is driven down the road, especially at freeway speeds. Airflow around the rotating wheels and tires forms eddies, creating significant turbulence and increasing drag to reduce vehicle efficiency. The net result is the creation of considerable aerodynamic drag.

BRIEF SUMMARY

In accordance with one embodiment of the present disclosure, a drag reducing system is provided. The drag reducing system generally includes a flow restricting deflector couplable to a mount and positioned upstream in a path of airflow to an object. The flow restricting deflector generally includes a body portion; and a plurality of flow choking orifices extending through the body portion. Each flow choking orifice has an inlet, an outlet, and an interior wall configured to provide a choked airflow condition.

In accordance with another embodiment of the present disclosure, a drag reducing assembly for a vehicle is provided. The drag reducing assembly generally includes a mounting bracket and a splash shield coupled to the mounting bracket. The splash shield is positioned adjacent a wheel and tire combination of the vehicle. A flow restricting deflector is also provided, and is coupled to and extending downwardly from the splash shield. The flow restricting deflector is positioned upstream in a path of airflow to the wheel and tire combination. The flow restricting deflector generally includes a body portion and a plurality of flow choking orifices extending through the body portion. Each flow choking orifice having an inlet, an outlet, and an interior wall configured to provide a choked airflow condition.

In accordance with any of the embodiments disclosed herein, the interior wall may have a slope such that the flow choking orifice is larger in area at the inlet than at the outlet to constrict the airflow.

In accordance with any of the embodiments disclosed herein, the slope of the interior wall may be linear.

In accordance with any of the embodiments disclosed herein, the slope of the interior wall may be concave curvilinear.

In accordance with any of the embodiments disclosed herein, the slope of the interior wall may be convex curvilinear.

In accordance with any of the embodiments disclosed herein, the drag reducing system may further include a splash shield extending from an upper edge of the body portion. In these and other embodiments the splash shield has a surface positioned adjacent a wheel and tire combination of a vehicle.

In accordance with any of the embodiments disclosed herein, a ratio of widths of the plurality of flow choking orifices to the width of the solid portions of the body portion may be between about 3 and 9.

In accordance with any of the embodiments disclosed herein, a ratio of widths of the plurality of flow choking orifices to the width of the solid portions of the body portion may be between about 5 and 7.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

BRIEF DESCRIPTION OF THE SEVERAL VIEWS OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

Figure 1:
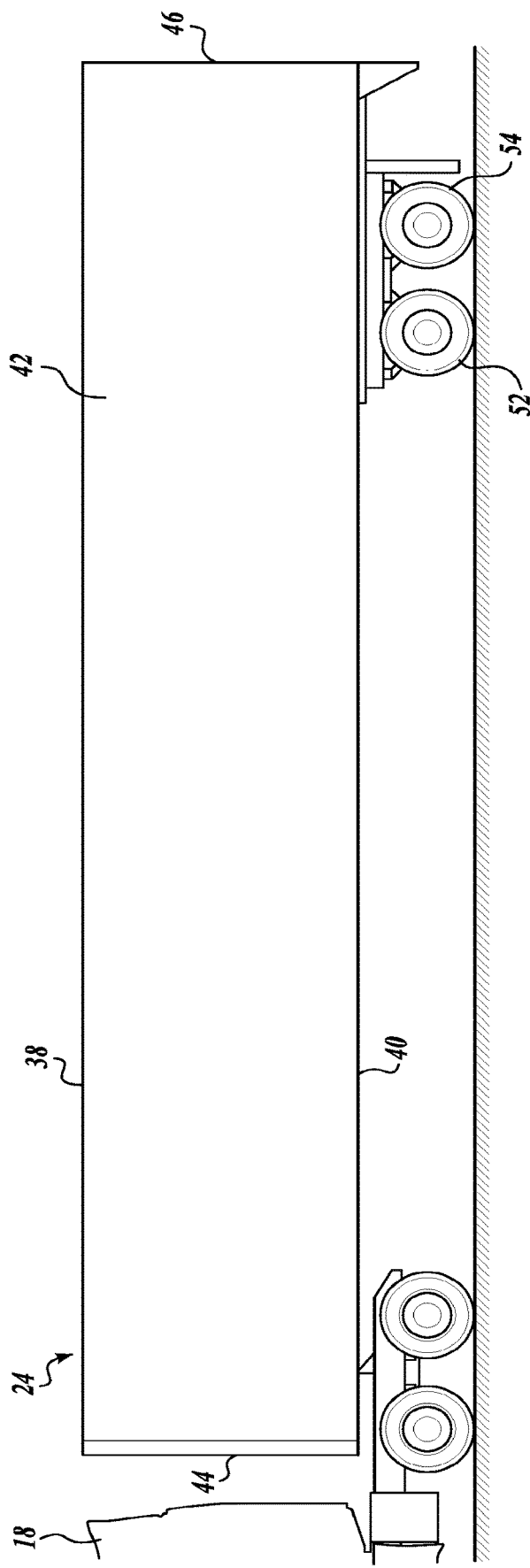
FIG. 1 is a side view of a conventional cargo-type trailer.

The over-the-highway cargo hauling tractor-trailer combination is one vehicle that experiences excessive aerodynamic drag. Generally described, tractor-trailer combinations typically include a tractor 18 having a so-called fifth wheel by which a box-like semi-trailer 24 may be attached to the tractor 18 by an articulated connection for transportation of the cargo in the trailer 24, as shown in FIG. 1. The shape of the conventional tractor-trailer combination provides numerous areas for aerodynamic inefficiency. In one aspect, the trailer 24 is essentially a rectangular box having a flat, rectangular roof 38 and matching floor 40, along with flat, rectangular side panels 42. The fore and aft vertical surfaces 44 and 46, respectively, of such trailers 24 are also generally flat rectangular surfaces. The aft section of the trailer 24 is supportably mounted on one or more wheel assemblies, illustrated as components 52 and 54.

Conventional large long-haul cargo trailers similar to those described above exhibit less than optimal aerodynamic performance during highway operation. At highway speeds, the components of the tractor-trailer combination develop a substantial amount of turbulent airflow throughout regions of the vehicle. This turbulence results in significant aerodynamic drag, increasing both fuel consumption and Nitrogen Oxide (NOx) emissions of the tractor 18.

Forward facing surfaces of bluff bodies draw considerable attention m aerodynamic designs. The forward surfaces are generally shaped with smooth transitions to provide for gentle diversion of the airflow around the bluff body. In some applications, such as with tandem (dual) and tridem (triple) drive and trailer axles, there is insufficient clearance forwardly of the forwardmost axle to provide for a smooth aerodynamic transition around the wheels and tires of the drive axles. In these examples, pressure drag forces simply transfer from the object being shielded (e.g. the wheels and tires), to the shield itself, generally resulting in a zero net aerodynamic drag improvement. Although the embodiments disclosed herein are described in reference to systems and devices that deflect airflow around the wheels and tires of the tandem or tridem rear axles of a vehicle, such a tractor or trailer, the disclosure should be construed as applying to any suitable position where flow deflection is desired.

In fluid dynamics, choked flow is a compressible flow effect limiting the airflow velocity based on the venturi effect. When a flowing fluid at a given pressure and temperature passes through a restriction (such as an orifice of a restriction plate) into a lower pressure environment, the airflow velocity increases. At upstream airflow conditions when the vehicle is traveling at highway speeds, the conservation of mass principle requires the airflow velocity increase as it flows through the smaller cross-sectional area of the orifice of the flow restriction deflector. At the same time, the venturi effect causes the static pressure, and therefore the density, to decrease downstream beyond the restriction deflector. Choked flow is a limiting condition where the mass flow will not increase with a further decrease in the downstream pressure environment while upstream pressure is fixed, e.g., at a fixed vehicle speed. Choked flow provides an upstream pressure buildup, as will be explained in greater detail below.

Embodiments of the present disclosure comprise drag reducing systems in the form of flow restricting deflectors configured to deflect air around the wheels and tires by means of flow choking restriction through orifices in the deflector, rather than by surface stagnation occurring with a deflecting surface without orifices. By applying flow resistance upstream of the bluff body through flow choking restriction of the deflector, high speed freestream flow (i.e., airflow that does not travel through orifices in the deflector or otherwise stagnate on a surface) is diverted around the bluff body by the pressure buildup on the upstream side. Pressure rise resulting from the airflow choking at an orifice of the deflector does not cause pressure drag in areas where deflector material is cut out. As a result, a deflector having flow choking orifices yields lower pressure drag than a conventional solid deflector, while continuing to provide similar airflow diversion around the object being shielded.

The following discussion provides examples of systems and methods for improving the aerodynamic efficiency (e.g., reduce drag) of vehicles, such as class 8 tractor-trailer combinations. To improve the aerodynamic efficiency of the combination, examples described herein provide one or more aerodynamic components positioned in the airflow stream forward of the outer components of the rear axles (generally, wheels and tires). In some examples described herein, the one or more aerodynamic components are in the form of flow restricting deflectors, which may be used in conjunction with a splash shield. In configurations where space between the wheels and tires and other components of the tractor, such as fuel tanks, is limited, particularly the tandem and tridem rear axle combinations, the flow restricting deflector may be suitably positioned upstream of the wheels and tires to reduce the total aerodynamic drag of the vehicle.

Figure 2:
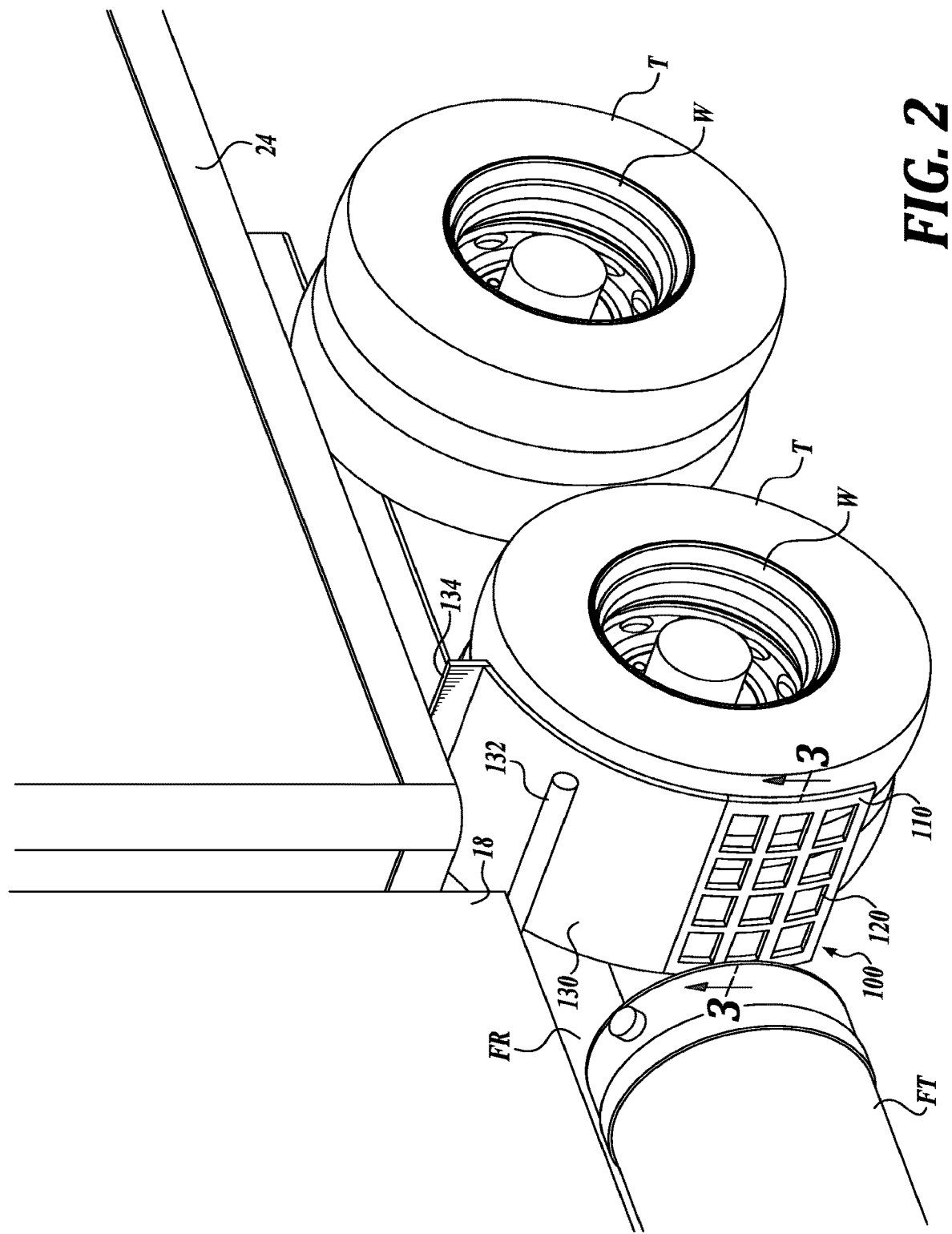
FIG. 2 is a front perspective view of one representative embodiment of a drag reducing system formed in accordance with aspects of the present disclosure, showing a splash shield and a flow restricting deflector.

Turning to FIG. 2, a perspective view of one example of an aerodynamic system is shown, generally denoted as a drag reducing system 100, having a flow restricting deflector 110, according to aspects of the present disclosure. The flow restricting deflector 110 is shown in a position upstream and in an airflow path from the front of the tractor 18 toward the wheels W and tires T of the rear axle of the tractor 18. In the illustrated embodiment, the rear axles (not shown) are in a tandem configuration having dual wheels W and tires T per axle outer end. In other embodiments, the rear axles may be in a single axle configuration, tridem axle configuration, or any other axle configuration. Likewise, in some embodiments, the rear wheel configuration includes large, single tires known as super-singles, which are also within the scope of the present disclosure.

As shown in FIG. 2, the tractor 18 and trailer 24 are positioned above the drag reducing system 100. In some configurations of the tractor 18, a fuel tank FT is positioned under the cab and/or sleeper portion of the tractor 18 along the frame rail FR. As illustrated, the fuel tank FT may be positioned near the forward axle of the tandem configuration, such that a smooth transition aerodynamic element does not have enough clearance to be located between the fuel take FT and the wheels W and tires T of the forward tandem axle. The embodiments of the present disclosure address the limited clearance of many tractor component layout configurations. In this regard, in other configurations, any component of the tractor may be located near the drag reducing assembly 100, such as access steps, air tanks, battery boxes, no-idle systems, etc.

The drag reducing system 100 includes the flow restricting deflector 110, which, in some embodiments, is coupled to a spray shield 130. In the embodiment shown, the spray shield 130 mounts to the frame rail FR with a mounting post 132, and optionally includes an upper extension 134 to direct airflow above the tires T. The spray shield 130 and optional upper extension 134 are positioned to prevent spray and debris from the rotating tires T to be carried through the rotation and released to be propelled forward into the tractor 18, the fuel tank FT, or any other component of the vehicle. The spray shield 130 is generally shaped to conform to the tires T such that the airflow contacting the spray shield 130 is generally directed around the sides of the spray shield 130, around the wheels W and tires T, and up over the upper extension 134 above the wheels W and tires T. Conventional spray shields comprise a solid panel without openings to block the spray and debris from the rotating tires T to contact the components of the vehicle. In this regard, as explained above, airflow impacting the spray shield 130 may stagnate and provide a high-pressure region assisting in directing the airflow around and above the spray shield 130. In the embodiments disclosed herein, the lower portion of the spray shield 130 includes the flow restricting deflector 110 extending down toward the ground in front of the wheels W and tires T. The flow restricting deflector 110 includes a plurality of flow choking orifices 120 positioned along the surface of the flow restricting deflector 110. In the embodiment shown, twelve rectangular flow choking orifices 120 are positioned along the surface of the flow restricting deflector 110. However, in other embodiments, any number and shape or size of flow restricting orifice is within the scope of the present disclosure, such as rounded, circular, oval, triangular, polygonal, and the like. The position of the flow restricting deflector 110 with respect to the spray shield 130 allows for the flow choking orifices 120 to be sized and shaped for the desired aerodynamic characteristics, without compromising the prevention of the spray and debris from the rotating tires T to be propelled forward into the tractor 18. Spray and debris from the tires T impacting the flow restricting deflector 110 would be directed at an angle as to not travel through the flow choking orifices 120 toward the tractor-trailer combination. Although the flow restricting deflector 110 is shown with a forward convex curvature generally following the arc of the splash shield 130, also referred to as a spray shield, and tires T, in other embodiments, the flow restricting deflector is planar, multi-planar, a complex curved surface, or any other suitable surface shape.

Figure 3:
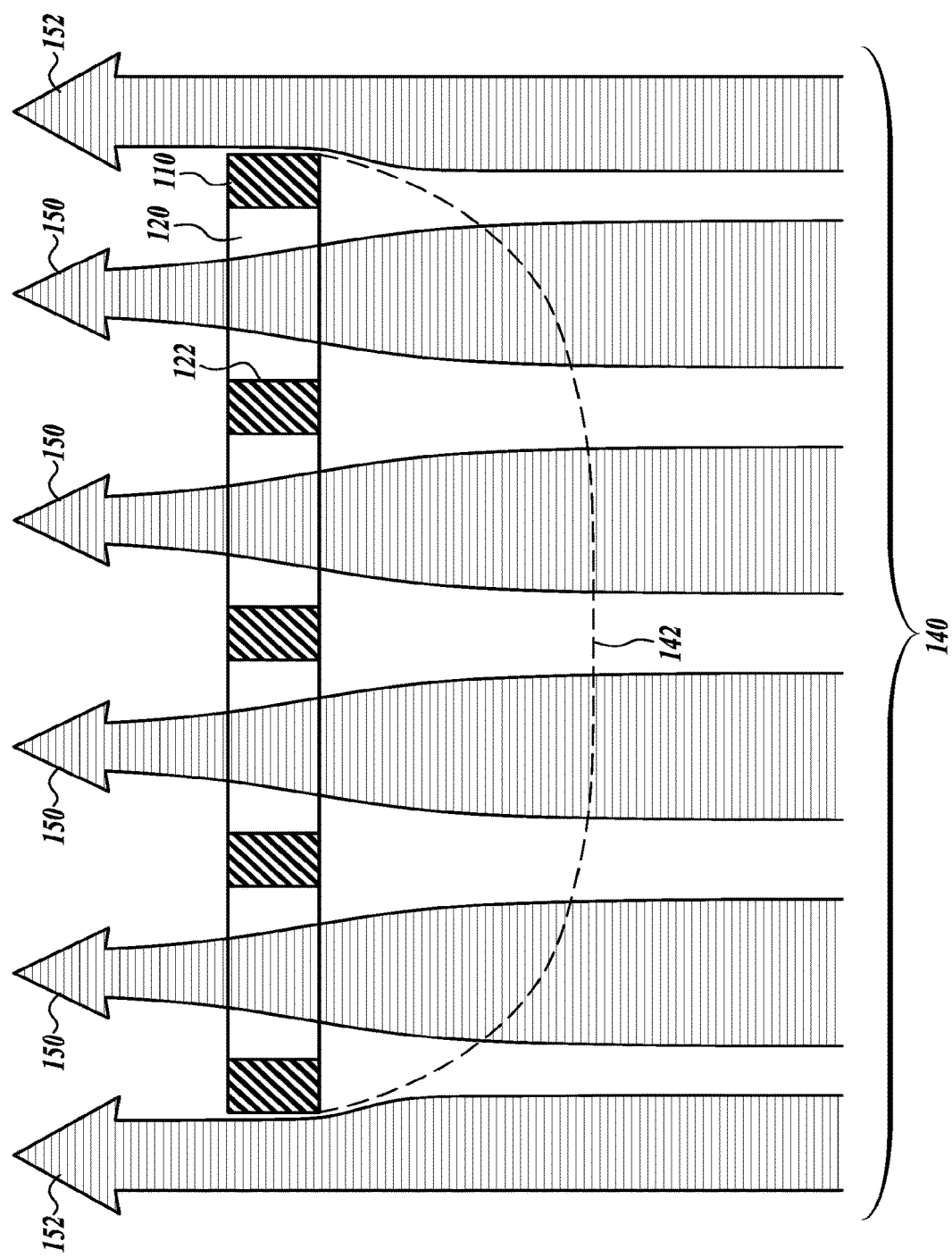
FIG. 3 is a cross-sectional bottom view of the flow restricting deflector of FIG. 2, showing representative airflow through flow choking orifices of the flow restricting deflector.

Turning now to FIG. 3, the aerodynamic flow characteristics of the flow restricting deflector 110 will now be explained in greater detail. As the inlet airflow 140 approaches the flow restricting deflector 110, it may be relatively uniform in flow characteristics, such as flow rate, temperature, density, and pressure. However, due to the complexity of the components positioned in front of the flow restricting deflector 110, the inlet airflow 140 may not be uniform due to certain vehicle configurations and environmental inputs. In this regard, the inlet airflow 140 is shown in a uniform matter for simplicity in the following description, but the control of non-uniform airflow is also within the scope of the present disclosure.

As certain streams of the inlet airflow 140 approach the flow restricting deflector 110, the stream may be aligned with one of the flow choking orifices 120 such that the stream flows through the flow choking orifice 120, increases in velocity, decreases a pressure, and forms a through-orifice airflow 150. The pressure differential from the inlet side of the flow choking orifice 120, to the outlet side, causes pressure buildup on the inlet side and an increased pressure area 142 in front of the flow restricting deflector 110. Due to the fluid dynamic characteristics of the airflow 140, the increased pressure area 142 may have generally parabolic shaped sections near the edges of the flow restricting deflector 110. As a result, some of the streams of the inlet airflow 140 will interact with the increased pressure area 142 and be directed around the flow restricting deflector 110. The deflected streams of the inlet flow 140 form a diverted airflow 152.

As described above, a solid surface without orifices would provide a deflection of the inlet airflow around the surface; however, the aerodynamic benefit of the through-orifice airflow 150 would not be realized in such a configuration. In the embodiments of the flow restricting deflector 110, the through-orifice airflow 150 and the diverted airflow 152 create a net decrease in aerodynamic drag of the vehicle between 0.2% and 2.0%. In other embodiments, the through-orifice airflow 150 and the diverted airflow 152 create a 1% net decrease in aerodynamic drag of the vehicle.

As viewed from the perspective of FIG. 3, the flow choking orifices 120 comprise a ratio of the overall width of the flow restricting deflector 110. In some embodiments, the ratio of flow choking orifices 120 to solid material width of the flow restricting deflector 110 is between about 3 and 9. In other embodiments, the ratio of flow choking orifices 120 to solid material width of the flow restricting deflector 110 is between about 5 and 7. In a similar manner, each flow choking orifice 120 comprises a width. In some embodiments, the width of the flow restricting deflector 110 is between about 22 inches and 28 inches. In these embodiments, the maximum width of each flow choking orifice 120 is about 6 inches. A frontal open area is defined as percentage of the total flow choking orifice area to the overall area of the flow restricting deflector. In this regard, in some embodiments, the frontal open area is between about 50% and about 99%. In other embodiments, the frontal open area is between about 50% and about 80%.

Figure 4A:
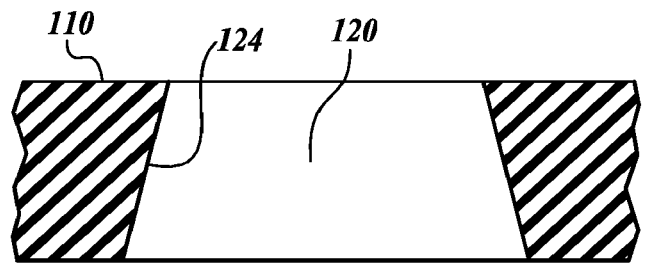
FIGS. 4A-4C are cross-sectional detail views of the interior wall shape of the flow choking orifices of FIG. 3.
Figure 4B:
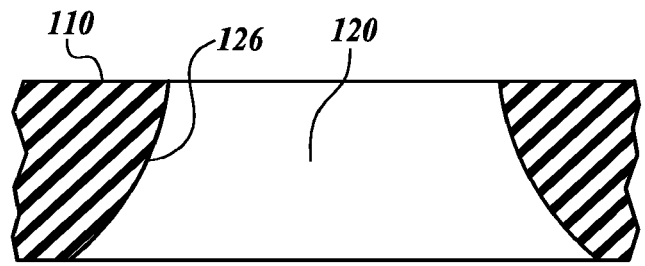
Figure 4C:
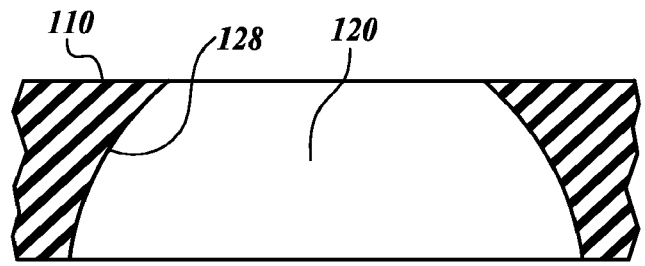

Turning to FIGS. 4A-4C, in some embodiments, the flow choking orifices 120 may have an internal shape to enhance the venturi effect of the through-orifice flow 150, such that a choked flow condition is present at the desired vehicle speeds. As shown in FIG. 3, the flow choking orifice 120 includes an interior wall 122 that is generally flat and linear through the thickness of the flow restricting deflector 110. In other embodiments, the shape of the interior walls of the flow choking orifice 120 may be linear, curvilinear, geometric, or any other suitable shape to provide the desired fluid dynamic characteristics at the vehicle speeds where the aerodynamic drag has a greater influence, i.e., at freeway speeds.

In one embodiment shown in FIG. 4A, the flow choking orifice 120 includes an interior wall 124 that is linearly sloping inward from the inlet to the outlet, such that the flow choking orifice 120 is constricting as the airflow 150 travels through the flow choking orifice 120. In another embodiment shown in FIG. 4B, the flow choking orifice 120 includes an interior wall 126 that is convex curvilinear sloping inward from the inlet to the outlet, such that the flow choking orifice 120 is constricting as the airflow 150 travels through the flow constricting orifice 120. In a further embodiment shown in FIG. 4C, the flow choking orifice 120 includes an interior wall 128 that is concave curvilinear sloping inward from the inlet to the outlet, such that the flow choking orifice 120 is constricting as the airflow 150 travels through the flow choking orifice 120. Although several examples of the configuration of the interior wall of the plurality of flow choking orifices 120 are shown, in other embodiments, any suitable interior wall shape and configuration of the flow choking orifices 120 is also within the scope of the present disclosure.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A splash shield, comprising:
   an upper body portion configured to be coupled to a mount of a vehicle such that the splash shield is positioned upstream an airflow path that occurs when the vehicle moves forward;
   a lower body portion; and
   a plurality of orifices extending through the lower body portion, each of the plurality of orifices having an inlet, an outlet, and an interior wall.

2. The splash shield of claim 1, wherein the interior wall of each of the plurality of orifices is sloped such that the inlet is larger than the outlet.

3. The splash shield of claim 2, wherein the slope of the interior wall of each orifice is linear.

4. The splash shield of claim 2, wherein the slope of the interior wall of each orifice is concave curvilinear.

5. The splash shield of claim 2, wherein the slope of the interior wall of each orifice is convex curvilinear.

6. The splash shield of claim 1, wherein the plurality of orifices are located in front of a tire of the vehicle when the splash shield is mounted to the vehicle.

7. The splash shield of claim 1, wherein a ratio of widths of the plurality of orifices to widths of solid portions of the lower body portion is between about 3 and 9.

8. The splash shield of claim 1, wherein a ratio of widths of the plurality of orifices to widths of solid portions of the lower body portion is between about 5 and 7.

9. A drag reducing assembly for a vehicle, comprising:
   a mounting bracket configured to be mounted to the vehicle;
   a splash shield coupled to the mounting bracket, the splash shield configured to be positioned upstream of a wheel and tire combination of the vehicle when mounted to the vehicle by the mounting bracket; and
   a flow restricting deflector extending from the splash shield, the flow restricting deflector having a first surface configured to face upstream and a second surface configured to face the wheel and tire combination, the flow restricting deflector including a body portion and a plurality of orifices, each of the plurality of orifices having an inlet at the first surface, an outlet at the second surface, and an interior wall extending between the first and second surfaces.

10. The drag reducing assembly of claim 9, wherein the splash shield and flow restricting deflector have a width configured to cover a dual wheel and tire combination.

11. The drag reducing assembly of claim 9, wherein the interior wall of each orifice is sloped such that the inlet is larger than the outlet.

12. The drag reducing assembly of claim 11, wherein the slope of the interior wall of each orifice is linear.

13. The drag reducing assembly of claim 11, wherein the entire interior wall is sloped.

14. The drag reducing assembly of claim 11, wherein the slope of the interior wall is concave curvilinear or convex curvilinear.

15. The drag reducing assembly of claim 11, wherein the flow restricting deflector is integrally formed with the splash shield.

16. A vehicle, comprising:
   a splash shield having an upper portion and a lower portion, the splash shield coupled to the vehicle at the upper portion, wherein the lower portion of the splash shield is located upstream of a wheel and tire combination of the vehicle, wherein the lower portion of the splash shield including a plurality of orifices, each of the plurality of orifices having an inlet, an outlet, and an interior wall, wherein air flow is able to flow through the orifices from the inlet to the outlet when the vehicle is moving.

17. The vehicle of claim 16, wherein the inlet of each orifices is larger than the outlet.

18. The vehicle of claim 17, wherein the interior wall is slope between the inlet and outlet.

19. The vehicle of claim 17, wherein the slope is one of: linear, concave curvilinear, or convex curvilinear.

20. The vehicle of claim 16, wherein the wheel and tire combination is a dual wheel and tire combination, wherein the splash shield has a width that covers the dual wheel and tire combination.

\* \* \* \* \*